United States Patent
Raffy

(10) Patent No.: US 8,557,010 B2
(45) Date of Patent: Oct. 15, 2013

(54) FUSED GRAINS OF OXIDES COMPRISING AL, TI, SI AND CERAMIC PRODUCTS COMPRISING SUCH GRAINS

(75) Inventor: Stephane Raffy, Cavaillon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 13 days.

(21) Appl. No.: 13/379,910

(22) PCT Filed: Jun. 25, 2010

(86) PCT No.: PCT/FR2010/051312
§ 371 (c)(1),
(2), (4) Date: Dec. 21, 2011

(87) PCT Pub. No.: WO2010/149940
PCT Pub. Date: Dec. 29, 2010

(65) Prior Publication Data
US 2012/0096822 A1    Apr. 26, 2012

(30) Foreign Application Priority Data
Jun. 26, 2009 (FR) ..................... 09 54378

(51) Int. Cl.
*B01D 39/14* (2006.01)
*B01D 39/06* (2006.01)
*B01D 50/00* (2006.01)
*B01D 24/00* (2006.01)

(52) U.S. Cl.
USPC ................. 55/523; 55/522; 55/524; 422/169; 422/170; 422/171; 422/172; 422/179; 422/180; 422/181; 422/182; 422/177; 422/178

(58) Field of Classification Search
USPC ............. 55/522–524; 422/169–172, 177–182
See application file for complete search history.

(56) References Cited

U.S. PATENT DOCUMENTS

| 4,767,731 A | 8/1988 | Asami et al. |
| 2007/0006561 A1* | 1/2007 | Brady et al. .................... 55/523 |
| 2011/0105318 A1 | 5/2011 | Raffy |

FOREIGN PATENT DOCUMENTS

| DE | 37 07 396 | 9/1988 |
| EP | 0 210 813 | 2/1987 |

OTHER PUBLICATIONS

International Search Report Issued Oct. 4, 2010 in PCT/FR10/51312 Filed Jun. 25, 2010.
U.S. Appl. No. 13/386,755, filed Jan. 24, 2012, Raffy.

* cited by examiner

*Primary Examiner* — Amber Orlando
(74) *Attorney, Agent, or Firm* — Oblon, Spivak, McClelland, Maier & Neustadt, L.L.P.

(57) ABSTRACT

Fused particles containing, by weight percent: more than 15% but less than 55% of $Al_2O_3$; more than 20% but less than 45% of $TiO_2$; more than 3% but less than 30% of $SiO_2$; less than 20%, in total, of at least one oxide selected from the group consisting of $ZrO_2$, $Ce_2O_3$, and $HfO_2$; less than 1% of MgO; and more than 1% but less than 15%, in total, of at least one selected from the group consisting of CaO, $Na_2O$, $K_2O$, SrO, $B_2O_3$, and BaO. Also, a ceramic product or material obtained by sintering the fused particles.

21 Claims, No Drawings

FUSED GRAINS OF OXIDES COMPRISING AL, TI, SI AND CERAMIC PRODUCTS COMPRISING SUCH GRAINS

The invention relates to particles for ceramic applications, consisting predominantly of oxides comprising the elements Al, Ti and Si. The invention also relates to a process for manufacturing such particles and to ceramic products formed from said particles or comprising them, in particular, but not solely, to filter structures or catalyst supports, especially used in an exhaust line of a diesel internal combustion engine.

In the rest of the description, for convenience and in accordance with customary practice in the ceramics field, said oxides comprising the elements Al, Ti and Si will be described with reference to the corresponding simple oxides $SiO_2$, $Al_2O_3$ or $TiO_2$. In particular, in the following description, the proportions of the various elements constituting the oxides according to the invention are given with reference to the weight of the corresponding simple oxides, relative to the percentage by weight of all of the oxides present in said particles.

In the rest of the description, the application of the particles according to the invention and their advantages in the specific field of filters or catalyst supports for eliminating pollutants comprised in the exhaust gas coming from a gasoline or diesel internal combustion engine will be more particularly described. However, it is obvious that such particles, by means of the advantages that they provide, can be used advantageously in many other applications in the ceramics field, especially in any field for which good thermal stability and/or a low thermal expansion coefficient (TEC) are required. The following fields may in particular be mentioned, without being restricted thereto: manufacture of refractory parts used in contact with aluminum or metals in the molten state; slide gate plates; metal filters; or manufacture of saggers for sintering furnaces.

In the particular case of exhaust gas pollution control structures, these are generally of the honeycomb type.

As is known, a particulate filter during its use is subjected to a succession of filtration (soot accumulation) and regeneration (soot elimination) phases. During the filtration phases, the soot particles emitted by the engine are retained and deposited inside the filter. During the regeneration phases, the soot particles are burnt off inside the filter, so as to restore the filtering properties thereof. It is therefore understood that the mechanical resistance properties, both at low temperature and high temperature, of the constituent material of the filter are of paramount importance for such an application. Likewise, the material must have a sufficiently stable structure so as to withstand, especially over the entire lifetime of the vehicle fitted therewith, temperatures which may rise locally up to values substantially above 1000° C., especially if certain regeneration phases are poorly controlled.

At the present time, the filters are mainly made of a porous ceramic, usually silicon carbide or cordierite. Such silicon carbide catalytic filters are for example described in the patent applications EP 816 065, EP 1 142 619, EP 1 455 923 or WO 2004/090294 and WO 2004/065088. Such filters make it possible to obtain chemically inert filtering structures which exhibit excellent thermal conductivity and have porosity characteristics, in particular the average size and the size distribution of the pores, which are ideal for their application in filtering the soot particles output from an internal combustion engine.

However, this material still has a number of intrinsic drawbacks. A first drawback is the somewhat high thermal expansion coefficient of SiC, greater than $4 \cdot 10^{-6}$ $K^{-1}$, which prevents the manufacture of large monolithic filters and usually requires the filter to be segmented into several honeycomb elements bonded together with a cement, as described in patent application EP 1 455 923. A second drawback, of an economic nature, is the extremely high firing temperature, typically above 2100° C., for sintering so as to ensure that the honeycomb structures have sufficient thermomechanical resistance, especially during successive regeneration phases of the filter. Such temperatures require the installation of special equipment that substantially increases the cost of the filter finally obtained.

On the other hand, although cordierite filters are known and have been used for a long time, because of their low cost, it is now known that problems may arise in such structures, especially during poorly controlled regeneration cycles, over the course of which the filter may be locally subjected to temperatures above the melting point of cordierite. The consequences of these hotspots may range from a partial loss of efficiency of the filter to its complete destruction in the severest cases. Furthermore, cordierite does not have sufficient chemical inertness at the temperatures reached during successive regeneration cycles and consequently is liable to react with and be corroded by the species coming from residues of lubricant, fuel or other oils, which have accumulated in the structure during filtration phases, which phenomenon may also be a cause of rapid deterioration in the properties of the structure.

For example, such drawbacks are described in patent application WO 2004/011124 which provides, to remedy said drawbacks, a filter based on aluminum titanate (60 to 90 wt %) reinforced with mullite (10 to 40 wt %), the durability of which is improved.

According to another construction, patent application EP 1 559 696 proposes the use of powders for manufacturing honeycomb filters obtained by reactive sintering of aluminum, titanium and magnesium oxides between 1000 and 1700° C. The material obtained after sintering is in the form of a mixture of two phases: a major phase of the pseudo-brookite ($Al_2TiO_5$) alumina titanate structural type comprising titanium, aluminum and magnesium and a feldspar minor phase of the $Na_yK_{1-y}AlSi_3O_8$ type.

However, experiments carried out by the applicant have shown that it is difficult at the present time to guarantee the performance of a structure based on materials of the alumina titanate type, in particular to achieve thermal expansion coefficient and/or mechanical strength and/or corrosion resistance values that are suitable for example to make them able to be used directly in a high-temperature application of the particulate filter type.

Most especially in the particular application of filtering particles by a material from a group of oxides, the corrosion resistance must be controlled so as to avoid modifying the porosity of the filter. More precisely, a high propensity to corrosion of the material used as a constituent of the filter results in a reaction liable to close up the porosity and considerably reduce the filtration capability and, in the severest cases, may be the cause of leakage because of a filtering wall being punctured.

According to a first aspect, the present invention relates to novel particles comprising an oxide material of the aluminum titanate type, said particles making it possible to obtain materials and products having properties such as those described above, which are substantially improved. The particles according to the invention may thus be advantageously used in many fields of application of ceramics and in particular for the manufacture of a filter and/or catalytic structure, typically a honeycomb structure.

More precisely, according to the first aspect, the present invention relates to fused particles having the following chemical composition, as a percentage by weight on the basis of the oxides:
more than 15% but less than 55% of $Al_2O_3$;
more than 20% but less than 45% of $TiO_2$;
more than 3% but less than 30% of $SiO_2$;
less than 20% in total of at least one oxide chosen from $ZrO_2$, $Ce_2O_3$ and $HfO_2$; and
less than 1% of MgO.

Preferably, $Al_2O_3$ represents more than 15% of the chemical composition, the percentages being given by weight on the basis of the oxides. For example, especially for an application of the porous structure type, $Al_2O_3$ may represent more than 25% and more preferably more than 35% of the chemical composition. Preferably, $Al_2O_3$ represents less than 54% or even less than 53% of the chemical composition, the percentages being given by weight on the basis of the oxides. Preferably, when $SiO_2$ represents more than 10% of the chemical composition, $Al_2O_3$ represents less than 52%, or even less than 51%, of the chemical composition, the percentages being given by weight on the basis of the oxides.

Preferably, $TiO_2$ represents more than 22% and very preferably more than 25% of the chemical composition. Preferably, $TiO_2$ represents less than 43% and very preferably less than 40%, or less than 38% or even less than 35% of the chemical composition, the percentages being given by weight on the basis of the oxides.

Preferably, $SiO_2$ represents more than 4%, or more than 6%, or more than 7%, or more than 8%, or more than 10%, or even more than 12% of the chemical composition. Preferably, $SiO_2$ represents less than 25% and very preferably less than 20% of the chemical composition, the percentages being given by weight on the basis of the oxides.

Preferably, MgO represents less than 0.9%, or less than 0.5% or even less than 0.1% of the chemical composition of the particles, by weight on the basis of the oxides.

The particles may furthermore comprise other elements such as Ca, Na, K, Sr, B and Ba, the total summed amount of said elements present being preferably less than 15 wt %, preferably less than 13 wt % or even less than 12 wt %, on the basis of the corresponding simple oxides CaO, $Na_2O$, $K_2O$, SrO, $B_2O_3$ and BaO relative to the weight of the sum of the oxides present in said particles. The total summed amount of said oxides may represent more than 1%, or more than 2%, or more than 4%, or more than 5% or even more than 6% of the chemical composition.

Preferably, the percentage by weight of the sum of the oxides CaO, $Na_2O$, $K_2O$, SrO, $B_2O_3$ and BaO in the particles (or the material obtained from the particles) is less than that of $SiO_2$, in particular when the proportion by weight of $SiO_2$ is less than 15%.

Preferably, if the oxide(s) $ZrO_2$ and/or $Ce_2O_3$ and/or $HfO_2$ is (are) present, it (they) represents (represent) in total more than 0.7%, or more than 0.8% and very preferably more than 1% of the chemical composition, the percentages being given by weight and on the basis of the oxides. Preferably, the oxide(s) $ZrO_2$ and/or $Ce_2O_3$ and/or $HfO_2$ represents (represent) in total less than 10% and very preferably less than 8% of the chemical composition. According to one possible embodiment, the particles preferably comprise very predominantly, or even exclusively, zirconium oxide, in the proportions described above. Without departing from the scope of the invention, even in such a case, some of the $ZrO_2$ may be chosen to be replaced with at least one oxide chosen from $Ce_2O_3$ and $HfO_2$, on the basis of replacing in molar percentage the element Zr with the element Ce and/or with the element Hf. This is especially the case when the Zr source used contains a substantial proportion of Hf, as is common in most zirconium sources available commercially at the present time.

The particles according to the invention may furthermore comprise other minor elements.

The particles may in fact comprise other elements such as Co, Fe, Cr, Mn, La, Y and Ga, the total summed amount of said elements present being preferably less than 2%, for example less than 1.5%, or even less than 1.2%, by weight on the basis of the corresponding oxides CoO, $Fe_2O_3$, $Cr_2O_3$, $MnO_2$, $La_2O_3$, $Y_2O_3$ and $Ga_2O_3$, relative to the weight of the sum of the oxides present in said particles. The percentage by weight of each minor element, in particular Fe, on the basis of the weight of the oxide, preferably corresponds to less than 0.7%, or less than 0.6% or even less than 0.5%.

In order for the present description not to be unnecessarily burdened, all the possible combinations according to the invention among the various preferred embodiments of the compositions of the particles according to the invention, such as those that have been described above, are not explicitly reported here. However, it is clear that all possible combinations of the ranges and initial and/or preferred values described above are nevertheless envisaged and must be considered as described by the applicant in the context of the present description (especially two, three or more combinations).

The fused particles according to the invention are mainly formed by an oxide phase of the aluminum titanate type and at least one silicate phase. The silicate phase or phases are in proportions that may range from 5 to 50% of the total weight of the particles, preferably from 8 to 45% and very preferably from 15 to 40% of the total weight of the particles. According to the invention, said silicate phase or phases may consist mainly of silica and alumina. Preferably, the proportion of silica in said silicate phase or phases is greater than 30%, or even greater than 35%.

According to a second aspect, the invention also relates to a ceramic product or material obtained by sintering the particles described above, said product or material comprising mainly or being formed by an oxide phase of the aluminum titanate type and a silicate phase.

Another phase, essentially consisting of titanium oxide $TiO_2$, and/or zirconium oxide $ZrO_2$ and/or cerium oxide $CeO_2$ and/or hafnium oxide $HfO_2$, may be present in said product or material, in particular when the $ZrO_2$ and/or $Ce_2O_3$ and/or $HfO_2$ content is greater than 0.7%.

Typically, a ceramic product (or material) according to the invention has the following chemical composition, in wt % on the basis of the oxides:
less than 55% of $Al_2O_3$;
more than 20% but less than 45% of $TiO_2$;
more than 3% but less than 30% of $SiO_2$;
less than 20%, in total, of at least one oxide chosen from $ZrO_2$, $Ce_2O_3$ and $HfO_2$; and
less than 1% of MgO.

In particular, said ceramic product may comprise, in wt % on the basis of the oxides and in total, more than 1% but less than 15% of at least one oxide chosen from the group formed by $Na_2O$, $K_2O$, CaO, BaO and SrO.

In general, all the embodiments described above in relation to the compositions of the fused particles can be directly transposed to the ceramic product (or material) according to the invention. Most particularly, all the preferred values and ranges described above in relation to the composition of the corresponding particles, especially all the values and ranges which relate, on the basis of the corresponding oxides, to the various elements liable to be in their composition, especially Al, Ti, Si, Zr/Ce/Hf, Mg, and the elements Ca, Na, K, Sr, B, Ba, or else the elements Co, Fe, Cr, Mn, La, Y and Ga, can be directly transposed to the composition of the product (or material) according to the invention.

Once again, in order for the present description not to be unnecessarily burdened, all the possible combinations according to the invention between the various preferred embodiments of the compositions of the products or materials according to the invention are not reported here. However, all possible combinations of the initial and/or preferred ranges and values are of course envisaged.

For example, according to one possible embodiment of the invention, the ceramic product according to the invention has the following chemical composition, in wt % on the basis of the oxides:
- more than 35% but less than 53% of $Al_2O_3$;
- more than 25% but less than 40% of $TiO_2$;
- more than 5% but less than 20% of $SiO_2$;
- less than 1% of MgO; and
- more than 2% but less than 13%, in total, of at least one oxide chosen from the group formed by CaO, $Na_2O$, $K_2O$, SrO, $B_2O_3$ and BaO.

Advantageously, the particles of the invention may be produced by the electric fuse-cast process, which enables large quantities of particles to be manufactured with high yields and a very good price/performance ratio.

The invention also relates to the process for manufacturing the particles described above, which comprises the following steps:
a) the raw materials are blended to form the starting feedstock;
b) the starting feedstock is melted until the molten liquid is obtained;
c) said molten liquid is cooled so that it is entirely solidified, for example in less than 3 minutes; and
d) said solid mass is ground so as to obtain a blend of fused particles, that is to say obtained by fused-casting.

According to the invention, in step a) the raw materials are chosen so that the particles obtained in step d) are in accordance with the invention.

Of course, without departing from the scope of the invention, any other conventional or known process for manufacturing fused particles may also be employed, provided that the composition of the starting feedstock allows particles having a composition according to that of the particles of the invention to be obtained.

In step b), it is preferred to use an electric arc furnace, but all known furnaces may conceivably be used, such as an induction furnace or a plasma furnace, provided that they allow the starting feedstock to be completely melted. Preferably, the firing is carried out under inert conditions, for example in argon, or under oxidizing conditions, preferably at atmospheric pressure.

In step c), the cooling may be rapid, that is to say the molten liquid is entirely solidified in less than 3 minutes. Preferably, the cooling results from casting the liquid into CS molds as described in the U.S. Pat. No. 3,993,119 or from quenching.

In step d), the solid mass is ground, using conventional techniques, until the size of the particles suitable for the envisaged application is obtained.

According to one particular application, the product according to the present invention has a honeycomb structure made of a porous ceramic material, said structure consisting of a porous ceramic material obtained from the particles according to the invention, said structure furthermore having a porosity of greater than 10% and a pore size centered between 5 and 60 microns.

When the structures obtained according to the invention are intended for use as a particulate filter, they have a suitable porosity, in general between 20 and 65%, the mean pore size ideally being between 10 and 20 microns.

Such filter structures usually have a central portion comprising a honeycomb filtering element or a plurality of honeycomb filtering elements bonded together by a jointing cement, said element or elements comprising an assembly of adjacent ducts or channels of mutually parallel axes separated by porous walls, which ducts are closed off at one or other of their ends by plugs so as to define inlet chambers opening onto a gas entry face and outlet chambers opening onto a gas discharge face, in such a way that the gas passes through the porous walls.

One process for manufacturing such a structure from an initial blend of particles according to the invention is for example the following:

Firstly, the fused particles according to the invention are blended as described above. For example, the fused particles are ground in such a way that they have a median diameter of less than 20 microns. The manufacturing process typically comprises a step of mixing an initial blend comprising the particles, an organic binder of the methyl cellulose type and a pore former, after which water is added until the desired plasticity for the following extrusion step is obtained.

For example, the first step involves mixing a blend comprising:
- at least 5%, for example at least 50%, or at least 90% or even 100% of particles according to the invention, the rest of the blend possibly consisting of a powder or particles of other materials or else simple oxides of the elements Al, Ti, Si or precursors of said oxides, for example in the form of carbonates, hydroxides or other organometallics of the above elements;
- optionally, 1 to 30% by weight of at least one pore former chosen according to the desired pore size;
- at least one organic plasticizer and/or one organic binder; and
- a certain amount of water in order to allow the product to be formed.

The term "precursor" is understood to mean a material that decomposes into the corresponding simple oxide often at an early stage in the heat treatment, that is to say at a heating temperature typically below 1000° C., or below 800° C. or even below 500° C.

The mixing results in a homogeneous product in the form of a paste. The step of extruding this product through a suitable die allows honeycomb-shaped monoliths to be obtained. The process then comprises for example a step of drying the monoliths obtained. During the drying step, the green ceramic monoliths obtained are typically dried by microwave heating or dried at a temperature for a time long enough to bring the content of non-chemically bonded water down to less than 1% by weight. If it is desired to obtain a particulate filter, the process may furthermore include a step of plugging every other channel at each end of the monolith.

The monolith firing step is carried out at a temperature above 1300° C. but not exceeding 1800° C., preferably not exceeding 1750° C. For example, during this firing step, the monolith structure is heated to a temperature of between 1400° C. and 1600° C., in an atmosphere containing oxygen or an inert gas.

The process may optionally comprise a step of assembling the monoliths into an assembled filter structure according to well-known techniques, for example those described in patent application EP 816 065.

In one example of an application, the present invention relates to a filter or a catalyst support obtained from a structure as described above and by deposition, preferably by impregnation, of at least one unsupported, or preferably unsupported, active catalytic phase typically comprising at least one precious metal, such as Pt and/or Rh and/or Pd, and optionally an oxide such as $CeO_2$, $ZrO_2$ or $CeO_2$—$ZrO_2$. Such structures are especially applicable as a catalyst support in an exhaust line of a diesel or gasoline engine or as a particulate filter in an exhaust line of a diesel engine.

The invention and its advantages will be better understood on reading the following non-limiting examples. In the examples, all the percentages are given by weight.

EXAMPLES

In all the examples according to the invention, the specimens were prepared from the following raw materials:
 AR75 alumina comprising more than 98% $Al_2O_3$, solid by Alcan and having a median diameter $d_{50}$ of about 85 µm;
 anatase comprising more than 98% $TiO_2$, sold by Altichem or rutile comprising more than 95% $TiO_2$ and having a median diameter $d_{50}$ of about 120 µm, sold by Europe Minerals;
 $SiO_2$ having a purity greater than 99.5% and a median diameter $d_{50}$=208 µm, sold by Sifraco;
 strontium carbonate comprising more than 98.5% $SrCO_3$, sold by Societe des Produits Chimiques Harbonnières;
 lime comprising about 97% CaO with more than 80% of the particles having a diameter of less than 80 µm;
 potassium carbonate comprising more than 99.5% $K_2CO_3$, sold by Albemarle with more than 80% of the particles having a diameter of between 0.25 and 1 mm; and
 zirconia having a purity greater than 98.5% and a median diameter $d_{50}$=3.5 µm, sold under the reference CC10 by Saint-Gobain ZirPro.

The specimens of the examples according to the invention were obtained by melting the blend of the above powders in the appropriate proportions given in Table 1.

More precisely, the initial blends of reactants were firstly melted in an electric arc furnace in air. The molten mixture was then cast in a CS mold so as to be rapidly cooled. The product obtained was ground and screened so as to retain 36 µm powder. This powder was used to produce pressed specimens 10 mm in diameter which were then sintered at the temperature indicated in Table 1 for four hours.

In particular:
 example 1 relates to a typical material according to the invention, obtained at a sintering temperature of 1400° C.;
 example 2 is identical to example 1, but the sintering temperature was increased to 1450° C.;
 in example 3 according to the invention, 17% by weight of a pore former, typically used in the manufacture of porous bodies of the particulate filter type, were additionally incorporated during the step of sintering the fused particles;
 example 4 according to the invention is similar to the above example 2, but zirconium was introduced into the material, and likewise in example 6;
 example 5 according to the invention contains only a very small amount of alkaline-earth metal oxide of the SrO or CaO type;
 example 7 relates to another composition according to the invention;

examples 8 to 10 relate to other materials obtained from fused particles according to the invention; and
 example 11 relates to a material formed by sintering particles comprising a small amount of $SiO_2$, in the context of the present invention.

Comparative specimens, not according to the invention, were also synthesized according to a method of preparation similar to that described above, with however the following modifications:
 in comparative example 1, the specimen was not synthesized by sintering the fused particles, that is to say from particles obtained by the prior melting of the blend of raw materials described above, but directly from reactive sintering of the powder blend of the following raw materials:
 Almatis CL4400FG alumina comprising 99.8% $Al_2O_3$ and having a median diameter $d_{50}$ of about 5.2 µm;
 TRONOX T-R titanium oxide comprising 99.5% $TiO_2$ and having a diameter of around 0.3 µm;
 971U grade Elkem microsilicia $SiO_2$ having a purity of 99.7%;
 strontium carbonate comprising more than 98.5% $SrCO_3$, sold by Société des Produits Chimiques Harbonnières;
 lime comprising about 97% CaO, with more than 80% of the particles having a diameter of less than 80 µm; and
 potassium carbonate comprising more than 99.5% $K_2CO_3$, sold by Albemarle with more than 80% of the particles having a diameter of between 0.25 and 1 mm.

In comparative example 2, the fused particles were synthesized by introducing too small an amount of silica $SiO_2$ into the initial reactants, with reference to the subject matter of the present invention.

In comparative example 7, the composition of the material was the same as that of example 7, but the material was obtained as in comparative example 1 by reactive sintering of the powder blend of the raw materials described above.

In comparative example 11, the composition of the material was the same as that of example 11, but the material was obtained as in comparative example 1 by reactive sintering of the powder blend of the raw materials described above.

The prepared specimens were then analyzed. The results of the analyses carried out on each of the specimens of the examples according to the invention and of the comparative examples are given in Tables 1 and 2.

In Tables 1 and 2:
1) the chemical composition, indicated in wt % on the basis of the oxides, was determined by X-ray fluorescence;
2) the crystalline phases present in the refractory products were characterized by X-ray diffraction. In Table 2, AT indicates a phase of the aluminum titanate ($Al_2TiO_5$) type and PS indicates a silicate phase, determined by microprobe analysis;
3) the thermal expansion coefficient (TEC) corresponds to the average of the conventionally obtained values from 25° C. to 1000° C. by dilatometry on disks prepared from powders with the same particle size distribution, the median diameter $d_{50}$ of which is between 10 and 15 µm. The disks were obtained by pressing followed by sintering at the temperature indicated in Table 1 for 4 h in air;
4) the MoR was measured at room temperature on a LLOYD machine equipped with a 10 kN load cell, by compression at a rate of 1 mm/min, on disks 10 mm in diameter and 12 mm in height prepared from powders having the same particle size distribution, the median diameter $d_{50}$ of which was less than 50 µm. The disks were obtained by pressing followed by sintering at the temperature indicated in Table 1 for 4 h in air;

5) the density was measured by conventional Archimedes' method. the theoretical density corresponds to the expected maximum density of the material in the absence of any porosity, and measured by helium picnometry on the ground product; and 6) the corrosion resistance was evaluated on example 3 according to the invention and on comparative example 1.

More precisely, 0.2 grams of $Na_2CO_3$ powder were deposited uniformly on the surface of a disk 35 mm in diameter of the product to be tested. The specimen thus covered was then heated at 1300° C. in air for 5 hours. After cooling, the specimen was cut along a radius and prepared as a section for observation by SEM (scanning electron microscopy). The corrosion-affected depth E of the specimen, starting from the initial surface of the disk, was then determined visually on the SEM micrographs.

the invention and comparative example 7, respectively, that the materials according to the invention have a significantly improved mechanical strength MoR, although the sintering temperature is 50° C. lower. Such an improvement is also observed at an equivalent density (compare especially example 3 according to the invention with comparative example 1);

comparison of the corroded thicknesses E between the specimen according to example 3 (according to the invention) and the specimen according to comparative example 1 also indicates however a better corrosion resistance for the material according to the invention; and as regards the density, for a similar composition and an identical sintering temperature it may be seen, by comparing the data in Table 1, that the densities obtained for materials according to the invention are substantially higher. Such an improvement may in particular prove to be decisive in applications that require above all a very

TABLE 1

| Example | Ex1 | Ex2 | Ex3 | Ex4 | Ex5 | Ex6 | Ex7 | Ex7 comp | Ex7b | Ex8 | Ex9 | Ex10 | Ex11 | Ex11 comp | Ex comp 1 | Ex comp 2 |
|---|---|---|---|---|---|---|---|---|---|---|---|---|---|---|---|---|
| $Al_2O_3$ | 45.7 | 45.7 | 45.7 | 46.4 | 45.5 | 43.6 | 52.8 | 52.8 | 52.8 | 51.8 | 45.9 | 50.0 | 53.6 | 53.7 | 49.1 | 53.5 |
| $TiO_2$ | 28.1 | 28.1 | 28.1 | 28.2 | 34.8 | 26.7 | 33.1 | 33.1 | 33.1 | 30.9 | 30.9 | 27.5 | 38.3 | 38.3 | 26.5 | 45.0 |
| $SiO_2$ | 15.5 | 15.5 | 15.5 | 14.9 | 16.9 | 14.0 | 7.9 | 7.9 | 7.9 | 10.3 | 10.7 | 15.0 | 4.2 | 4.2 | 14.0 | 0.12 |
| SrO | 9.34 | 9.34 | 9.34 | 8.54 | | 8.25 | 4.63 | 4.63 | 4.63 | 5.25 | | | 2.20 | 2.20 | 9.05 | |
| CaO | 1.13 | 1.13 | 1.13 | 1.11 | 0.57 | 1.00 | 0.59 | 0.59 | 0.59 | 0.85 | 1.60 | 6.76 | 0.33 | 0.33 | 1.31 | 0.05 |
| BaO | | | | | | | | | | 0.18 | 9.84 | | | | | |
| $Na_2O$ | 0.13 | 0.13 | 0.13 | 0.13 | 1.30 | 0.14 | 0.16 | 0.16 | 0.16 | 0.09 | 0.10 | 0.12 | 0.16 | 0.16 | | 0.16 |
| $K_2O$ | 0.09 | 0.09 | 0.09 | | 0.97 | | | | | | | | | | | 0.10 |
| $Fe_2O_3$ | 0.06 | 0.06 | 0.06 | 0.36 | | 0.33 | 0.40 | 0.40 | 0.40 | 0.31 | 0.31 | 0.34 | 0.70 | 0.70 | 0.02 | 0.04 |
| $ZrO_2$ | | | | 0.31 | | 5.97 | 0.39 | 0.39 | 0.39 | 0.35 | 0.65 | 0.28 | 0.39 | 0.39 | | |
| 4-h sintering temperature (° C.) | 1400 | 1450 | 1450 | 1450 | 1400 | 1400 | 1450 | 1450 | 1400 | 1450 | 1400 | 1400 | 1450 | 1450 | 1450 | 1400 |
| Density | 2.70 | 3.10 | 2.32 | 3.07 | 2.85 | 2.53 | 3.19 | 2.21 | 2.53 | 3.19 | 3.16 | 2.9 | 2.64 | 2.3 | 2.30 | 2.45 |
| Density as a percentage of the theoretical density | 78.0 | 89.6 | 67.0 | 89.2 | 92.5 | 71.4 | 89.4 | 61.9 | 70.8 | 88.1 | 87.2 | 86.0 | 71.7 | 62.5 | 66.4 | 65.5 |
| TEC ($10^{-6}$/° C.) | 3.8 | 2.4 | 2.7 | 2.5 | 5.3 | 3.2 | 1.6 | 1.6 | 3.1 | 1.86 | 4.1 | 3.8 | 2.4 | | 3.5 | 3.2 |
| MoR | 126 | | 79 | | 230 | 124 | 230 | 37 | 93 | | 283 | 225 | 58 | 32 | 45 | 36 |
| E (mm) | | | 1.75 | | | | | | | | | | | | 2.96 | |

Analysis of the data given in Table 1 clearly shows the superiority of the products/materials obtained from the particles according to the invention:

for a similar thermal expansion coefficient, it is observed that the material or product obtained from the fused particles according to the invention (example 1 or example 7) has mechanical strength MoR and a density that are both significantly improved relative to the material obtained by conventional methods, as illustrated by comparative example 1 or comparative example 7;

for a similar composition and the same sintering temperature, it is observed that the material or product obtained from the fused particles according to the invention (example 2) has a thermal expansion coefficient close to or even sometimes smaller than that of the material obtained by conventional methods, as illustrated by comparative example 1;

for a similar composition, it is observed, by comparing the values obtained for the material according to example 1 according to the invention and comparative example 1, or for the material according to example 7b according to high density of the material, for example in applications in which the product is in contact with a corrosive medium (for example of the slag or molten metal type); a lesser porosity enables the infiltration resistance to be improved. This may also be useful in applications that require above all a very high mechanical strength of the material, for example in the field of foundry filters.

Comparative example 2 also shows that such performance according to the invention can be achieved only if the amount of silicon in the material, expressed on the basis of the percentage by weight of the corresponding oxide $SiO_2$, is sufficient, especially greater than 3%. If this is not the case, no improvement in the MoR strength is observed.

Example 5 according to the invention shows that materials according to the invention but containing only small amounts of alkali or alkaline-earth metal oxides also have advantageous properties, especially extremely high MoR strength values. The material of example 5 is also characterized by a somewhat high thermal expansion coefficient, which could make it difficult for it to be used in the field of particulate filters. Such properties may be very useful in applications that require above all a very high mechanical strength of the material, for example in the field of foundry filters.

Example 11 shows that the MoR strength tends to decrease substantially when the material is obtained from particles comprising a smaller amount of $SiO_2$.

Comparing example 7 and example 11 both according to the invention with comparative example 7 and comparative example 11, respectively, shows that the materials or products obtained from the fused particles according to the invention (examples 7 and 11) have a significantly higher MoR strength than that of the materials obtained by conventional methods of the reactive sintering type (comparative examples 7 and 11).

More generally, according to various alternative embodiments of the present invention, it is possible, especially depending on the envisaged application:
- either to obtain better properties associated with a desired composition of the material, at a given sintering temperature;
- or else to adjust a high porosity level of the material (in particular by addition of a pore former during the step of sintering the fused particles) while maintaining good mechanical integrity, especially for an application of the material in the field of particulate filters.

The composition of each phase of the materials obtained according to examples 2 and 4 was determined by microprobe analysis, the results of the analysis being given in Table 2 below. Based on these results, the percentage by weight of each phase was able to be estimated.

TABLE 2

|  | Example | | | |
| --- | --- | --- | --- | --- |
|  | 2 | | 4 | |
|  | AT | PS | AT | PS |
| $Al_2O_3$ | 56.2 | 30.7 | 55.2 | 31.13 |
| $TiO_2$ | 42.6 | 3.7 | 41.7 | 1.27 |
| $SiO_2$ | 0.33 | 38.9 | 0.83 | 41.7 |
| SrO | 0 | 23.97 | 0.37 | 24.1 |
| CaO | 0 | 2.7 | 0.03 | 3.33 |
| MgO | 0 | 0 | 0 | 0 |
| $Na_2O$ | 0 | 0.33 | 0 | 0.37 |
| $K_2O$ | 0 | 0 | 0 | 0 |
| $Fe_2O_3$ | 0.1 | 0 | 0.4 | 0.1 |
| $ZrO_2$ | 0.33 | 0.47 | 0.5 | 0 |
| Estimated percentage | 61 | 39 | 66 | 34 |

Other specimens according to the invention were prepared in examples 12 to 16 (see Table 3 below), by sintering particles that had been fused beforehand and then finely ground, according to a method of preparation identical to that described above. In example 12, a very small fraction of zirconium is present. In examples 13 to 16, at least some of the zirconium, and even all of the zirconium, is replaced with cerium. Initially, the cerium is introduced into the molten blend in the form of a commercially available cerium oxide $CeO_2$.

TABLE 3

| Example | Ex12 | Ex13 | Ex14 | Ex15 | Ex16 |
| --- | --- | --- | --- | --- | --- |
| $Al_2O_3$ | 50.6 | 49.3 | 49.0 | 45.7 | 46.6 |
| $TiO_2$ | 30.5 | 30.1 | 29.5 | 29.4 | 28.8 |
| $SiO_2$ | 11.3 | 10.7 | 10.4 | 10.5 | 9.7 |
| SrO | 6.05 | 5.20 | 5.10 | 5.50 | 4.90 |
| CaO | 0.76 | 0.77 | 0.76 | 0.65 | 0.64 |
| $La_2O_3$ | 0.19 | 0.22 | 0.24 | 0.12 | 0.22 |
| $ZrO_2$ | 0.08 | | | 4.31 | 5.42 |
| $CeO_2$ | | 3.34 | 4.68 | 3.36 | 3.27 |
| 4-h sintering temperature (° C.) | 1400 | 1400 | 1400 | 1400 | 1400 |
| Density | 2.62 | 3.26 | 3.28 | 3.31 | 3.36 |
| Density as a percentage of the theoretical density | 74.2 | 90.1 | 90.7 | 91.5 | 92.9 |
| TEC ($10^{-6}$/° C.) | 3.6 | 2.7 | 2.45 | 2.0 | 2.3 |
| MoR | 178 | | 241 | 264 | |

Table 3 shows that very satisfactory MoR strength values, combined with low thermal expansion coefficients, may also be obtained according to the invention for such materials.

In the examples and the description above, the invention has most particularly been described in relation to the advantages that it provides for use in the field of particulate filters.

However, it is obvious that the invention also relates to the use of the particles of the invention in other applications, in particular all those in which a sufficiently low TEC and/or a suitable density are necessary. According to the invention, it may in particular be possible to adapt the size of the fused particles depending on the application, in particular by choosing a suitable grinding method.

The invention claimed is:

1. Fused particles comprising, by weight percent:
   more than 15% but less than 55% of $Al_2O_3$;
   more than 20% but less than 45% of $TiO_2$;
   more than 3% but less than 30% of $SiO_2$;
   less than 20%, in total, of at least one selected from the group consisting of $ZrO_2$, $Ce_2O_3$, and $HfO_2$;
   less than 1% of MgO;
   more than 1% but less than 15%, in total, of at least one selected from the group consisting of CaO, $Na_2O$, $K_2O$, SrO, $B_2O_3$, and BaO,
   wherein the weight percents are based on a sum of all oxides being 100 wt %,
   wherein the fused particle is obtained by melting the $Al_2O_3$ the TiO, the $SiO_2$, less than 20%, in total, of at least one selected from the group consisting of $ZrO_2$, $Ce_7O_3$, and $HfO_2$; less than 1% of MgO; more than 1% but less than 15%, in total, of at least one selected from the group consisting of CaO, $Na_2O$, $K_7O$, SrO, $B_7O_3$, and BaO to a molten liquid, cooling the molten liquid into a solid mass, and grinding the solid mass to produce the fused particle.

2. The fused particles of claim 1, comprising more than 25 wt % $Al_2O_3$.

3. The fused particles of claim 1, comprising less than 54 wt % $Al_2O_3$.

4. The fused particles of claim 1, comprising more than 22 wt % $TiO_2$.

5. The fused particles of claim 1, comprising less than 43 wt % $TiO_2$.

6. The fused particles of claim 1, comprising more than 6 wt % $SiO_2$.

7. The fused particles of claim 1, comprising less than 25 wt % $SiO_2$.

8. The fused particles of claim 1, comprising less than 0.5 wt % MgO.

9. The fused particles of claim 1, comprising less than 10 wt %, in total, of at least one selected from the group consisting of $ZrO_2$, $Ce_2O_3$ and $HfO_2$.

10. The fused particles of claim 1, comprising less than 13 wt %, in total, of at least one selected from the group consisting of CaO, $Na_2O$, $K_2O$, SrO, $B_2O_3$, and BaO.

11. The fused particles of claim 10, wherein the total of the at lease one selected from the group consisting of CaO, $Na_2O$, $K_2O$, SrO, $B_2O_3$, and BaO is more than 2 wt %.

12. The fused particles of claim 1, further comprising less than 2 wt %, in total, of at least one selected from the group CoO, $Fe_2O_3$, $Cr_2O_3$, $MnO_2$; $La_2O_3$, $Y_2O_3$ and $Ga_2O_3$.

13. A ceramic obtained by a process comprising sintering the fused particles of claim 1, wherein the ceramic mainly comprises an oxide phase of aluminum titanate and a silicate phase.

14. The ceramic of claim 13, comprising, by weight percent:
   less than 55% of $Al_2O_3$;
   more than 20% but less than 45% of $TiO_2$;
   more than 3% but less than 30% of $SiO_2$;
   less than 20%, in total, of at least one selected from the group consisting of $ZrO_2$, $Ce_2O_3$, and $HfO_2$;
   less than 1% of MgO; and
   more than 1% but less than 15%, in total, of at least one selected from the group consisting of CaO, $Na_2O$, $K_2O$, SrO, $B_2O_3$, and BaO,
   wherein the weight percents are based on a sum of all oxides being 100%.

15. The ceramic of claim 14, comprising, by weight percent:
   more than 35% but less than 53% of $Al_2O_3$;
   more than 25% but less than 40% of $TiO_2$;
   more than 5% but less than 20% of $SiO_2$;
   less than 1% of MgO; and
   more than 2% but less than 13%, in total, of at least one selected from the group consisting of CaO, $Na_2O$, $K_2O$, SrO, $B_2O_3$, and BaO,
   wherein the weight percents are based on a sum of all oxides being 100 wt %.

16. A honeycomb structure, comprising a ceramic of claim 13,
   wherein the honeycomb structure is suitable for use as a catalyst support or particulate filter in an automobile exhaust line.

17. The fused particles of claim 1, comprising more than 35 wt % $Al_2O_3$.

18. The fused particles of claim 1, comprising less than 53 wt % $Al_2O_3$.

19. The fused particles of claim 1, comprising more than 25 wt % $TiO_2$.

20. The fused particles of claim 1, comprising less than 38 wt % $TiO_2$.

21. The fused particles of claim 1, comprising more than 0.7 and less than 20%, in total, of at least one selected from the group consisting of $ZrO_2$, $Ce_2O_3$, and $HfO_2$.

* * * * *